(12) United States Patent
Sonar et al.

(10) Patent No.: US 11,360,798 B2
(45) Date of Patent: Jun. 14, 2022

(54) SYSTEM AND METHOD FOR INTERNAL SCALABLE LOAD SERVICE IN DISTRIBUTED OBJECT STORAGE SYSTEM

(71) Applicant: Nutanix, Inc., San Jose, CA (US)

(72) Inventors: Anirudha Narsinha Sonar, San Jose, CA (US); Dhruv Vijay Doshi, Bangalore (IN); Rajkumar Arunkumar Joshi, San Jose, CA (US)

(73) Assignee: Nutanix, Inc., San Jose, CA (US)

(*) Notice: Subject to any disclaimer, the term of this patent is extended or adjusted under 35 U.S.C. 154(b) by 113 days.

(21) Appl. No.: 16/836,649

(22) Filed: Mar. 31, 2020

(65) Prior Publication Data
US 2021/0157625 A1 May 27, 2021

Related U.S. Application Data

(60) Provisional application No. 62/940,054, filed on Nov. 25, 2019.

(51) Int. Cl.
*G06F 9/46* (2006.01)
*G06F 9/455* (2018.01)
*G06F 9/50* (2006.01)
*G06F 9/54* (2006.01)

(52) U.S. Cl.
CPC .......... *G06F 9/45558* (2013.01); *G06F 9/505* (2013.01); *G06F 9/5083* (2013.01); *G06F 9/547* (2013.01); *G06F 2009/4557* (2013.01); *G06F 2009/45579* (2013.01); *G06F 2009/45591* (2013.01)

(58) Field of Classification Search
CPC ..... G06F 9/45558; G06F 9/505; G06F 9/5083
See application file for complete search history.

(56) References Cited

U.S. PATENT DOCUMENTS

| | | | |
|---|---|---|---|
| 8,549,518 B1 | 10/2013 | Aron et al. | |
| 8,626,967 B1 * | 1/2014 | Naik | G06F 3/06 710/38 |
| 8,850,130 B1 | 9/2014 | Aron et al. | |
| 9,258,625 B2 * | 2/2016 | Martin | H04N 21/6582 |
| 9,973,785 B1 * | 5/2018 | Yang | H04N 21/2187 |
| 10,210,167 B1 * | 2/2019 | Sorenson, III | G06F 3/061 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Camquy Truong
(74) *Attorney, Agent, or Firm* — Foley & Lardner LLP

(57) ABSTRACT

An illustrated embodiment disclosed herein is an apparatus including a processor having programmed instructions to receive, from a user device, a request to identify a service for which a first load capability correlates with a second load capability of the endpoint. The processor has programmed instructions to, for each of a plurality of services of the endpoint, send one or more I/O requests, determine a metric associated with the one or more I/O requests, and determine a load capability based on the metric. The processor has programmed instructions to identify a first service having a load capability that satisfies a threshold and send, to the user device, an indication of the first service.

21 Claims, 6 Drawing Sheets

(56) References Cited

U.S. PATENT DOCUMENTS

| | | | |
|---|---|---|---|
| 2006/0168337 A1* | 7/2006 | Stahl | H04L 47/2441 |
| | | | 709/240 |
| 2006/0239234 A1* | 10/2006 | Rao | H04L 67/24 |
| | | | 370/338 |
| 2017/0085473 A1* | 3/2017 | Zhu | H04L 45/64 |
| 2018/0081548 A1* | 3/2018 | Barzik | G06F 3/064 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

* cited by examiner

SYSTEM AND METHOD FOR INTERNAL SCALABLE LOAD SERVICE IN DISTRIBUTED OBJECT STORAGE SYSTEM

CROSS-REFERENCE TO RELATED APPLICATION

This application is related to and claims priority under 35 U.S. § 119(e) from U.S. Provisional Application No. 62/940,054, filed Nov. 25, 2019, titled "SYSTEM AND METHOD FOR INTERNAL SCALABLE LOAD SERVICE IN DISTRIBUTED OBJECT STORAGE SYSTEM," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

Aspects of the present disclosure relate generally to a virtualization environment, and more particularly to a system and method for an internal, scalable load service in a distributed object storage system.

An illustrated embodiment disclosed herein is an apparatus including a processor having programmed instructions to receive, from a user device, a request to identify a service for which a first load capability correlates with a second load capability of the endpoint. The processor has programmed instructions to, for each of a plurality of services of the endpoint, send one or more I/O requests, determine a metric associated with the one or more I/O requests, and determine a load capability based on the metric. The processor has programmed instructions to identify a first service having a load capability that satisfies a threshold and send, to the user device, an indication of the first service.

Another illustrated embodiment disclosed herein is a computer-implemented method including receiving, by a processor and from a user device, a request to identify a service for which a first load capability correlates with a second load capability of the endpoint. The method includes, for each of a plurality of services of the endpoint, sending, by the processor, one or more I/O requests, determining, by the processor, a metric associated with the one or more I/O requests, and determining, by the processor, a load capability based on the metric. The method includes identifying, by the processor, a first service having a load capability that satisfies a threshold and sending, by the processor and to the user device, an indication of the first service.

Another illustrated embodiment disclosed herein is a non-transitory computer readable storage medium having instructions stored thereon that, upon execution by a processor, causes the processor to perform operations including receiving, from a user device, a request to identify a service for which a first load capability correlates with a second load capability of the endpoint. The operations include, for each of a plurality of services of the endpoint, sending one or more I/O requests, determining a metric associated with the one or more I/O requests, and determining a load capability based on the metric. The operations include identifying a first service having a load capability that satisfies a threshold and sending an indication of the first service.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
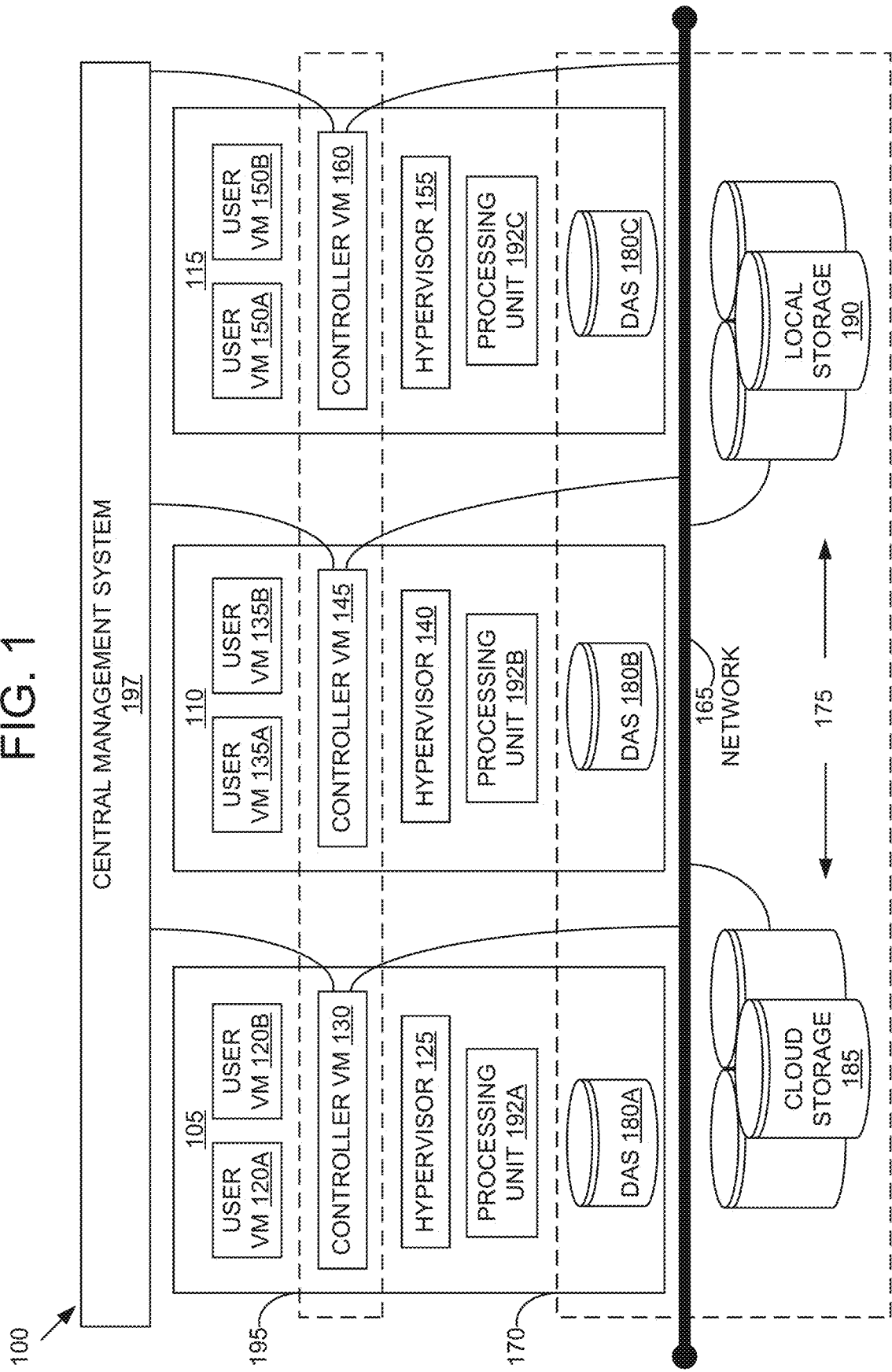
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In object storage exposing representational state transfer (REST) interface or HTTP interface, an application programming interface (API) user or application may encounter inputs/outputs (I/O) related issues. Conventionally, the API user or application uses common mechanisms like retries, caching, or running local tests to verify a status of the endpoint such as object store services (OSS). However, the API user or application may not have access or the endpoint does not provide capability for the API user or application to make intelligent decisions. The endpoint may only provide admin access API and/or I/O API (for I/O like PUT, GET, DELETE, etc.).

Conventional endpoints such as webservers or OSS provide vague hints of an underlying issue to the API user or application. For example, the OSS may return AccessDenied, InternalError, or a 503 error (e.g., the system is not available). The endpoint does not give much information beyond the error. The case becomes much worse when only certain subset of API calls fails or when performance is poor but not failing. The endpoint can, in some cases, close a connection for various reasons before completing the entire transfer. For example, the backend calls to storage are too busy and the backend remote procedure calls (RPCs) timeout. The API user or the application is left wondering if it is their stack (e.g., the endpoint itself, the operating system, processing, network, or memory resources) or it is anything else. Thus, there is a technical problem of an API user or application not knowing the root cause of an underlying issue.

Moreover, even if it is clear that an error is attributed to the endpoint and not from a network connecting the API user to the endpoint, it may not be clear which service of the endpoint is causing the error. For example, OSS may include multiple services such as a data service, a metadata service, a configuration service, etc. Without knowing which service is causing the error, the API user may have to reboot, reinstall, or otherwise repair the entire endpoint instead of only the faulty service. This may increase the time for repair and limit available network bandwidth and lead to an inefficient use of compute, storage, and network resources.

To address the technical problem described above, some embodiments of the present disclosure include an automatic elastic end-to-end load service. The load service is an intelligent load generator living in close proximity to the cluster, either as part OSS deployment or within in a same hyper converged cluster. The API user or application experiencing difficulties in accessing the cluster or observing the degraded performance can query the cluster and get a recent I/O status of a target service (e.g., at least one of the OSS or one or more of its services). The I/O status can indicate whether the OSS is having degraded performance or functionality issues. In some embodiments, the load service observes the current usage of the target service based on the resource usage. In some embodiments, the load service fills in the remaining capacity (e.g., throughput and IOPS). The load service can ensure that a load itself does not overwhelm the target service. In some embodiments, the load service provides the API user or application (and/or admin) an estimate of how much more load the target service can take or if the target service is overloaded, return that as a warning. Advantageously, some embodiments of the present disclosure help an API user or application understand the target service performance better and reduce the amount of time it takes to discover and repair degraded target services in the field.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Internal Scalable Load Service In Distributed Object Storage System

Figure 2A:
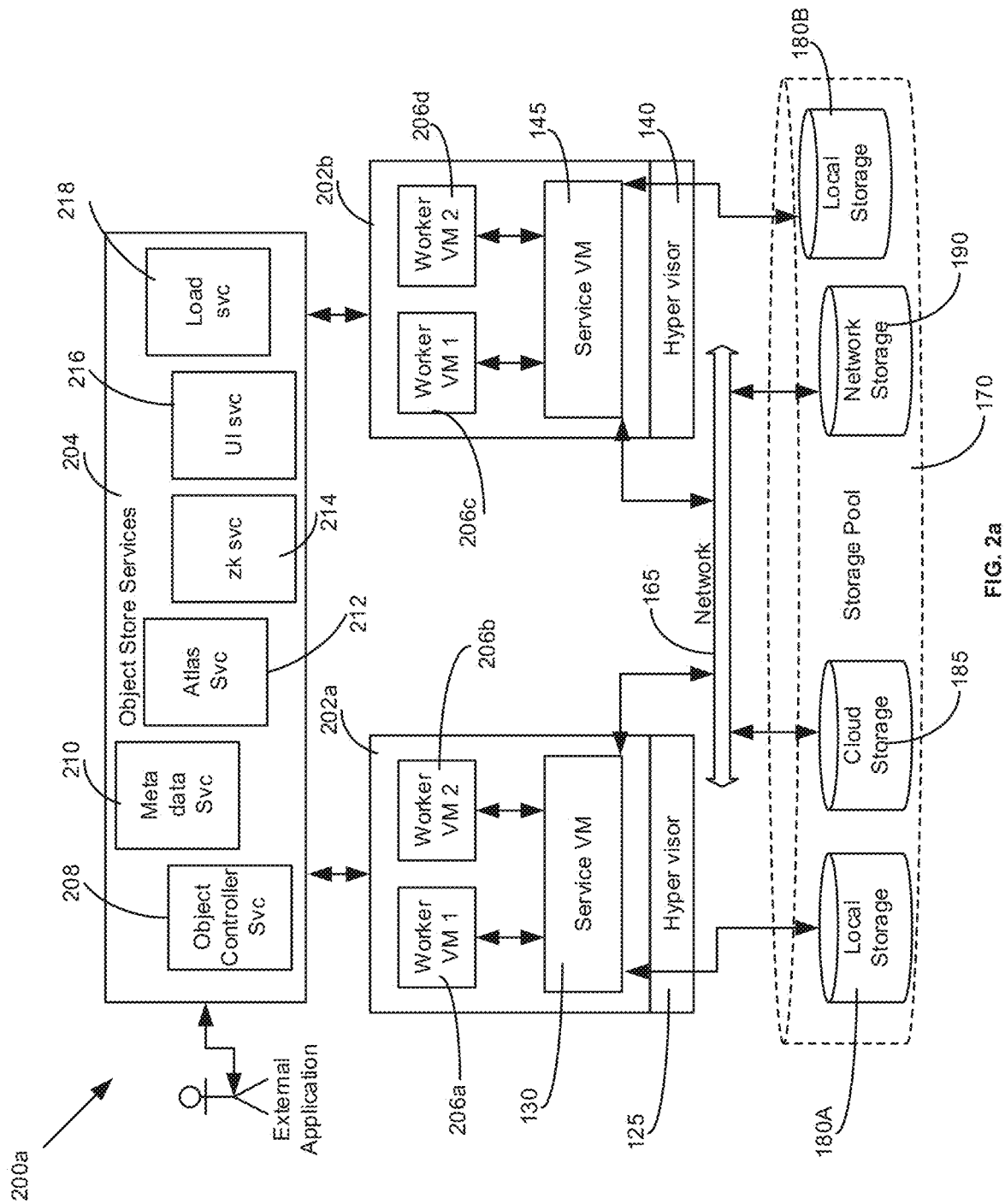
FIG. 2a illustrates a hyper converged infrastructure (HCI), in accordance with some embodiments of the present disclosure.

FIG. 2a illustrates a hyper converged infrastructure (HCI) 200a, in accordance with some embodiments of the present disclosure. The HCI 200a includes a cluster of nodes (e.g., a node 202a and node 202b—generally, node 202), a storage pool 170, and a network 165 coupling the each node 202 of the cluster of nodes and the storage pool 170 to each other. Each node 202 includes object store services (OSS) 204, one or more worker VMs 206, a controller/service VM, a hypervisor, and local storage (e.g., the node 202a includes an OSS 204, worker VMs 206a-b, the controller/service VM 130, the hypervisor 125, and the local storage 180A, and the node 202b includes an OSS 204, worker VMs 206c-d, the controller/service VM 145, the hypervisor 140, and the local storage 180B). The storage pool 170 includes the local storage 180A, the local storage 180B, the cloud storage 185, and the network storage 190. In some embodiments, the nodes 202a-b are instances of the nodes 105 and 110, respectively, with respect to FIG. 1. In some embodiments, the object storage systems 204, and/or the worker VMs 206a-d are instances of user VMs (e.g., the user VMs 120A-B and the user VMs 135A-B) with respect to FIG. 1. In some embodiments, the HCI 200a includes N nodes. In some embodiments, the number of worker VM's 206 per node 202 may be varied.

The OSS 204 is an endpoint that serves requests from an external user or application (e.g., user device). The OSS 204 includes services such as an object controller service 208, a metadata service 210, a lifecycle service 212, a configuration manager 214, a user interface service 216 and a load service 218. The object controller service 208 stores object data and performs functions such as tiering and replication. In some embodiments, the object controller service 208 stores object data by sending data inputs/outputs (I/Os) to, and receiving data I/Os from, a virtual disk controller coupled to the storage pool 170. The metadata service 210 manages buckets (constructs in which objects are stored) and manages object versions. The lifecycle service 212 is responsible for object lifecycle policy enforcement and performing garbage collection. The configuration manager 214 manages entity (e.g., cluster, node, controller VM, worker VM, OSS VM, and disk) configuration and health, which may include managing entity identifiers, entity status, and entity metrics such as I/O usage, CPU usage, storage usage, IOPS, and throughput. The user interface 216 provides an API interface between clients and the OSS 204. The load service 218 performs load balancing functions and more, as described below. In some embodiments, the OSS 204 is implemented by (e.g., implemented by, deployed on, running on, included in, etc.) a worker VM 206 and/or a user VM 120 with respect to FIG. 1. In some embodiments, the OSS 204 is distributed across multiple worker VMs 206, user VMs 120, and/or nodes 202. For example, the object controller 208 is implemented by the worker VM 206a, the metadata service 210 is implemented by the worker 206b, the lifecycle service 212 is implemented by the worker VM 206c, and the load service 218 is implemented by the worker VM 206d.

Figure 2B:
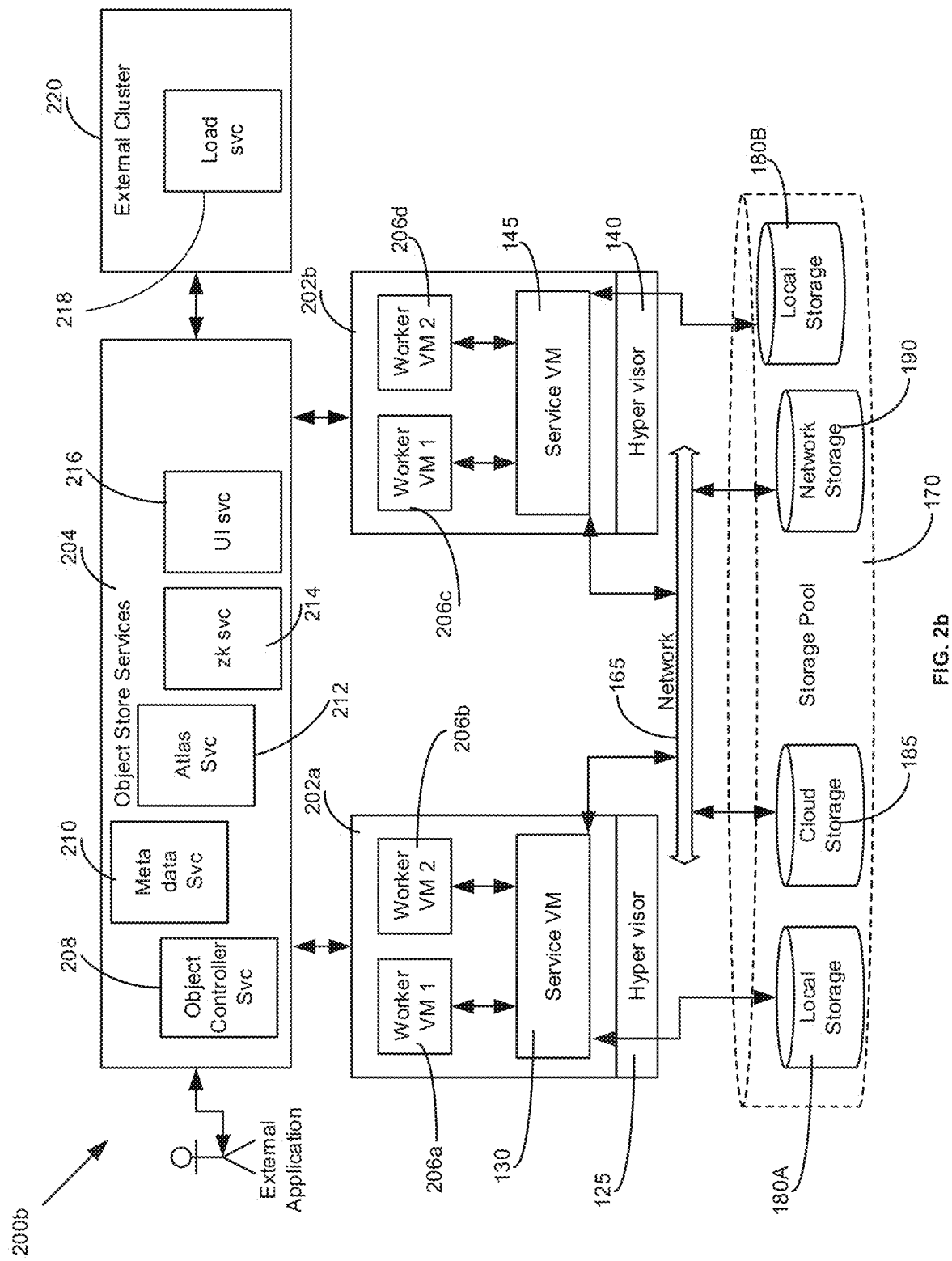
FIG. 2b illustrates an HCI, in accordance with some embodiments of the present disclosure.

FIG. 2b illustrates an HCI 200b, in accordance with some embodiments of the present disclosure. In some embodiments, the HCI 200b is similar to the HCI 200a except for the differences described herein. In FIG. 2a, the load service 218 is shown as being part of the OSS 204. However, in FIG. 2b, the load service 218 is shown and as being a part of external cluster 220. In some embodiments, the external cluster 220 is a different containerized cluster (like Kubernetes cluster) sharing a same HCI (e.g., HCI 200b). In some embodiments, the external cluster 220 is part of a different HCI cluster. In some embodiments, the load service 218 can transition (e.g., move, migrate, copy, clone, etc.) from the OSS 204 to the external cluster 220, and vice versa.

Figure 3:
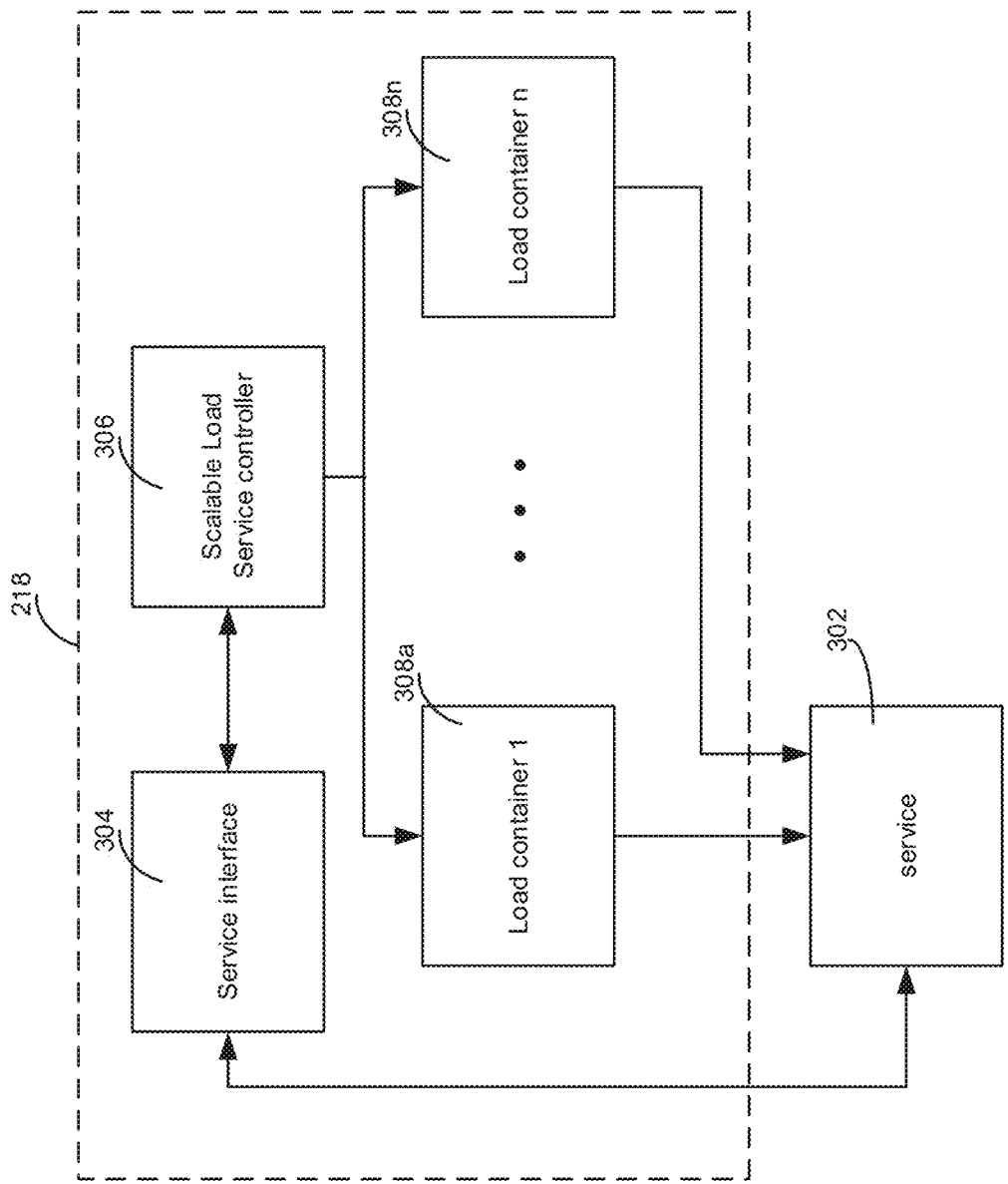
FIG. 3 illustrates the load service, in accordance with some embodiments of the present disclosure.

FIG. 3 illustrates the load service 218, in accordance with some embodiments of the present disclosure. The load service 218 includes an service interface 304, a scalable load service controller 306, and one or more load containers 308a-n. The scalable load controller 306 can generate a load on a service 302 (e.g., the OSS 204 or one or more of the services thereon such as the object controller service 208, the metadata service 210, a load balancer, etc, wherein the OSS 204 is an endpoint that is serving I/O to an external user or application). In some embodiments, the load is a series of I/O requests. In some embodiments, the load is generated without noticeable changes to the external I/O. In some embodiments, the scalable load controller 306 creates necessary compute and network nodes (worker VMs and containers 206) for generating the load to the service 302. The scalable load controller 306 can scale up and down to generate the I/O as need.

The requests for internal load and results of the load can be provided through an service interface 304. In some embodiments, the service interface 304 includes an application programming interface (API) and/or a remote procedure call (RPC) interface. In some embodiments, the service interface 304 can administer and return functionality and/or performance data to the service 302. In some embodiments, the service interface 304 can notify the service 302 through standard APIs, custom APIs, or headers of standard APIs. An external user can probe (e.g., request information about) the load capabilities of an endpoint (e.g., OSS, the cluster OSS is on, etc., the services in the OSS, etc.) using an application programming interface (API). In some embodiments, the service interface 304 can respond to external user API requests by providing information about the load capabilities of the endpoint.

The load containers 308a-n (e.g., containers, virtual machines, computing resources, processors, etc.) can serve I/Os to the service 302. The load containers 308a-n can either be part of the OSS 204 or an external cluster such as the external cluster 220. In some embodiments, the load containers 308a-n generate the load using an external OSS I/O API. In some embodiments, each load container 308 would be able to measure the end-to-end latency and throughput of an API call. In some embodiments, the service 302 that load containers 308a-n serve I/Os to ("a first service") is same as the service 302 that the service interface 304 is coupled to ("a second service"). In some embodiments, the first service and the second service are different services.

In some embodiments, the scalable load controller 306 can determine whether the service 302 can handle the load. Handling the load may include successfully respond to the I/Os from the load containers 308a-n within a predetermined time, having a CPU usage below a predetermined threshold, having a throughput above a predetermined threshold, or the like. In some embodiments, the scalable load controller 306 can increase a number of the load containers 308a-n serving I/O requests or increase the rate at which the load containers 308a-n serve I/O requests in response to the service 302 handling the load.

In some embodiments, the scalable load controller 306 generates a load on multiple services 302. For example, the scalable load controller 306 generates a first load on the object controller service 208 and a second load on the metadata service 210. In some embodiments, the scalable load controller 306 can determine for each of the services 302 whether a respective load is to be increased.

In some embodiments, the scalable load controller 306 indicates to the external user or application the capacity or throughput of the OSS 204 or any of the services thereon. In some embodiments, the external user or application can compare the capacity or throughput provided scalable load controller 306 with its own measurement of the capacity or throughput of the OSS 204. If the user's measured capacity or throughput is the same, the user can deduce that any degradation in capacity or throughput is coming from the OSS 204. If the user's measured capacity or throughput is lower, the user can deduce that at least a portion of the degradation in capacity or throughput is coming from a network between the user and the OSS 204. In some embodiments, the scalable load controller 306 can receive these measurements from the user and send alerts to the user indicating what the source of the degradation is (e.g., the OSS 204 or the network).

In some embodiments, the load service 218, including the scalable load controller 306, is initialized as a service external to the OSS 204 (e.g., the load service 218 is initialized in an external cluster, host, server, etc.). The scalable load controller 306 may generate a load for the OSS 204, increases as appropriate, and determines the throughput or capacity of the OSS 204, as described above and with respect to FIGS. 4 and 5. In some embodiments, the scalable load controller 306 determines that the throughput or capacity of the OSS 204 is lower than a predetermined threshold. The predetermined threshold may be set by the user, a policy, an algorithm, etc. In some embodiments, the scalable load controller 306, alone or as part of the load service 218, migrates or is cloned to the OSS 204 if the OSS 204 determines that the throughput or capacity of the OSS 204 is lower than the predetermined threshold. Responsive to migrating or being cloned to the OSS 204, the scalable load controller 306 can generate a load for each of the services in the OSS 204, increases each load as appropriate, and determines the throughput or capacity of each of the services, as described above and with respect to FIG. 5. In some embodiments, the scalable load controller 306 determines that the throughput or capacity of one or more of the services are lower than a second predetermined threshold, so that the scalable load controller 306 can determine that the one or more of the services are the root cause of the OSS 204 being below the predetermined threshold. In some embodiments, the scalable load controller 306 determines that the throughput or capacity of all of the services are greater than a second predetermined threshold, so that the scalable load controller 306 can determine that a network between the OSS 204 and the external cluster is the root cause of the OSS being below the predetermined threshold.

In some embodiments, the load service 218 can include role-based access control (RBAC). The RBAC can restrict network access based on roles of individual users within a system (e.g., the HCI 200a, the OSS 204, or the load service 218). The RBAC support may prevent a nefarious user that can understand the performance of the system from exploiting the system. The RBAC support may prevent distributed denial of service (DDOS) attacks.

In some embodiments, the load service 218 has minimal to no reliance on the underlying storage stack (e.g., the storage pool 170 with respect to FIG. 1). In some embodiments, the load service 218 has certain capabilities like in-memory random data generation and random file interface. In some embodiments, the load service 218 is used for other systems/services alternative to or in addition to the OSS 204. For example, the load service 218 is included in a VM (e.g., one of the user VMs 102a-b or one of the worker VMs 206a-d) and writes to a virtual disk exposed by the controller VM 130 via internet small computer system interface (iSCSI) or network file system (NFS) interface. That is, in some embodiments, the load service 218 writes to the DAS 180a through the iSCSI or the NFS interface. Further details regarding virtual disks are described below and in the U.S. Pat. No. 8,601,473, which is hereby incorporated by reference in its entirety. In some embodiments, the load service 218 is used for on-premises systems (e.g., data centers), cloud deployments, or a combination thereof.

Each of the entities of the HCI 200a (e.g., the nodes 202a-b, the OSS 204, the worker VMs 206a-d, the object controller service 208, the metadata service 210, the lifecycle service 212, the configuration manager 214, the user interface service 216, the load service 218, the service interface 304, the scalable load service controller 306, the load containers 308a-n, or a combination thereof) is an apparatus, in some embodiments. The apparatus includes one or more processors (e.g., the processing unit 192A, 192B, or 192C). For example, the components of the load service 218 (e.g., the service interface 304, the scalable load service controller 306, the load containers 308a-n) may share a processor. The one or more processors are hardware or a combination of hardware and software, in some embodiments. The one or more processors have programmed instructions that, upon being executed, causes the apparatus to perform operations (e.g., read, write, send, receive, identify, determine, calculate, and the like). The programmed instructions are stored on non-transitory storage media (e.g., the storage pool 170), in some embodiments.

Figure 4:
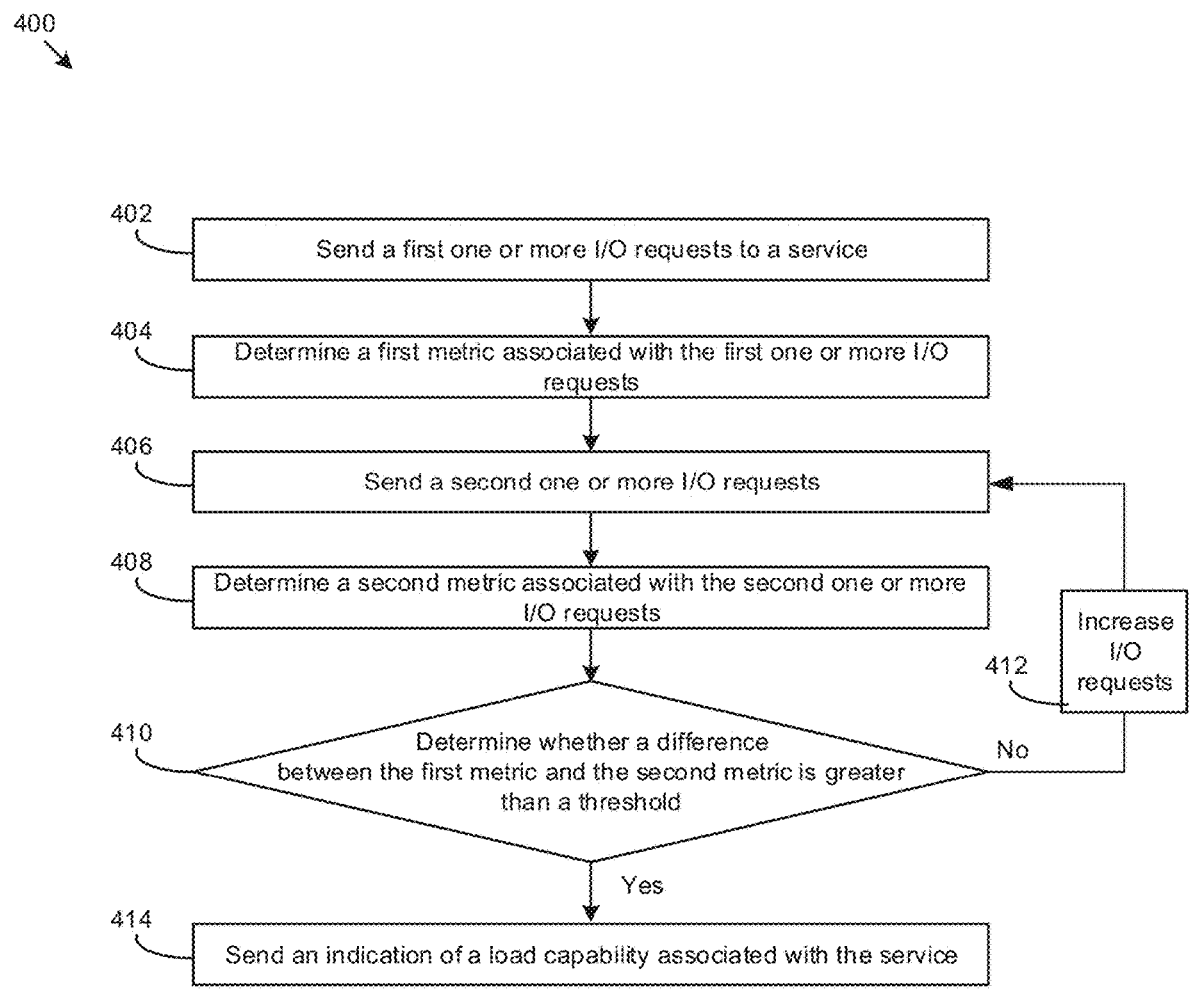
FIG. 4 is an example method for determining load capability, in accordance with some embodiments of the present disclosure.

Referring now to FIG. 4, an example method 400 for determining load capability is shown, in accordance with some embodiments of the present disclosure. The method 400 may be implemented using, or performed by, one or more of the components of the HCI 200a and/or the load service 218, which is detailed herein with respect to FIG. 2 and FIG. 3. The method 400 may be implemented using, or performed by, the load service 218, one or more components thereof, and/or a processor associated with the load service 218 or one or more of the components thereof. Additional, fewer, or different operations may be performed in the method 400 depending on the embodiment.

A processor, such as a processor associated with the load service 218 (e.g., the service interface 304, the scalable load service controller 306, the load containers 308a-n), sends, or causes one or more first load containers such as the load container 308a to send, a first one or more I/O (read or write) requests to a service such as the service 302 (402). In some embodiments, the processor sends an one or more API calls such as one or more GET requests or PUT requests using, e.g., representational state transfer (REST) interface or other HTTP interface. In some embodiments, the processor generates the one or more first load containers. In some embodiments, the processor receives, from the service, a response to at least one of the first one or more I/O requests. The processor determines (e.g., determines, identifies, calculates, measures, estimates, etc.) a first metric (e.g., latency, throughput, capacity, etc.) associated with the first one or more I/O requests (404). In some embodiments, the processor determines a first metric associated with the one of the first one or more I/O requests. For example, the processor determines, a latency from sending the one of the first one or more I/O requests and receiving the response to the one of the first one or more I/O requests. In some embodiments, the processor determines a first metric associated with an average of the first one or more I/O requests.

The processor sends a second one or more I/O requests, or causes one or more second load containers to send some of the second one or more I/O requests (406). In some embodiments, the second one or more I/O requests is greater than the first one or more I/O requests. In some embodiments, the one or more second load containers includes one or more second load containers and one or more additional load containers. In some embodiments, the processor generates the one or more additional load containers. In some embodiments, the processor sends (e.g., up to) X (e.g., 1, 2, etc.) I/O requests per each load container. In some embodiments, the processor receives, from the service, a second response to at least one of the second one or more I/O requests. The processor determines a second metric associated with the second one or more I/O requests (408). In some embodiments, the processor determines a difference of the first metric and the second metric.

The processor determines whether the difference of the first metric and the second metric (410) is greater than a difference threshold. If the processor determines that the difference between the first metric and the second metric is not greater than (e.g., is less than or equal to) the difference threshold, processor increases a number of requests in the one or more second I/O requests (412). Then, the method returns to step 408. Thus, on next iteration of steps 406-410, the processor sends a greater number of I/O requests than on the previous iteration. If the processor determines that the difference between the first metric and the second metric is greater than the difference threshold, the processor sends indication, to the service (e.g., or a user or application associated with the service), of a load capability (e.g., capacity) associated with service (414). Indication may include that the capability is equal to, less the, or associated with, the (e.g., latest iteration of) one or more second I/O requests. For example, if the second group of I/O requests is 5 I/O requests when the difference between the first metric and the second metric is greater than the difference threshold, the processor can send an indication, to the service, that the load capability is 5 I/O requests, 5 load containers, a number of bits associated with 5 I/O requests (e.g., 5 GB), a capacity associated with the 5 IOs (e.g., 5 GB/s), or the like.

In some embodiments, the processor determines load capability (e.g., the method 400 is performed) responsive to the service or a user associated with the service scheduling or being assigned to a job, the service or a user associated with the service requesting indication of load capability, a throttling service indicating that the throttling service will throttle the service, and the like. In some embodiments, the processor periodically determines the load capability. The periodicity can be set by a user, policy, or system. In some embodiments, the processor compares a latest load capability to a previous load capability to determine a load capability difference. In some embodiments, if the processor determines that the load capability difference is greater than a load capability difference threshold, the processor determines that the service (e.g., one of the nodes or VMs of, or associated with the service) is failing. In some embodiments, the processor indicates to the service (e.g., or a user or application associated with the service) that the service is failing. The service may be an endpoint to the external user serving workload requests or a service running in the endpoint. In some embodiments, the external user has no direct interface with the service running in the endpoint.

Figure 5:
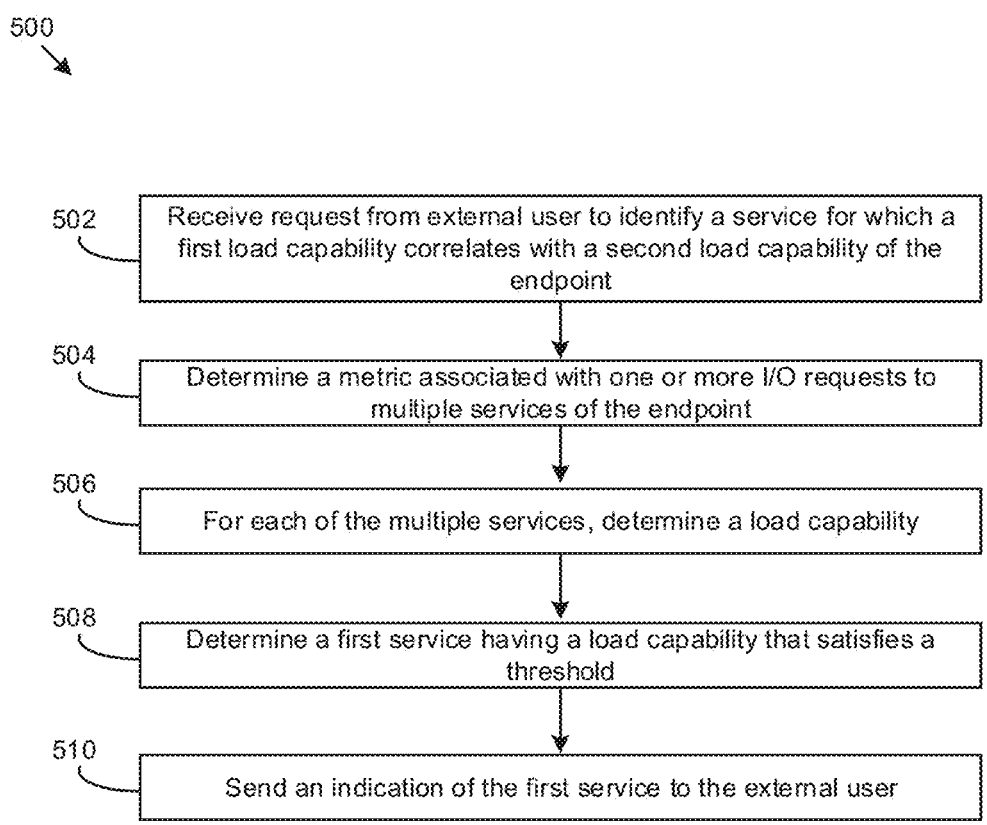
FIG. 5 is an example method for determining load capability, in accordance with some embodiments of the present disclosure.

Referring now to FIG. 5, an example method 500 for determining load capability is shown, in accordance with some embodiments of the present disclosure. The method 500 may be implemented using, or performed by, one or more of the components of the HCI 200a and/or the load service 218, which is detailed herein with respect to FIG. 2 and FIG. 3. The method 500 may be implemented using, or performed by, the load service 218, one or more components thereof, and/or a processor associated with the load service 218 or one or more of the components thereof. Additional, fewer, or different operations may be performed in the method 500 depending on the embodiment. Operations of method 400 and method 500 may be combined in any order.

A processor, such as a processor associated with the load service 218, receives a request from an external user (502). In some embodiments, the request is to identify a load capability of an endpoint (e.g., OSS 204). In some embodiments, the request is to identify a service for which a first load capability correlates with (e.g., causes or is related to) a second load capability of the endpoint. In some embodiments, the second load capability of the endpoint is a degraded load capability.

The processor determines a metric (e.g., latency, throughput, capacity, etc.) associated with one or more I/O requests to multiple services (e.g., object controller service 208, a metadata service 210, a lifecycle service 212, a configuration manager 214, a user interface service 216) of the endpoint (504). The processor may determine the metric in response to sending the one or more I/O requests to the multiple services. The I/O requests may be sent using load containers. See method 400 for details. The metric is compared to a threshold. If the threshold is not exceeded, a second one or more I/O requests are sent to each of the multiple services. The process continues until the threshold is exceeded. In some embodiments, the threshold is predetermined (e.g., static). In some embodiments, the threshold is dynamic. In some embodiments, the threshold is a latency, throughput, or the like. In some embodiments, such as in method 400, the threshold is a differential of latency or throughput.

For each service of the endpoint, the processor determines a load capability (506). In some embodiments, the load capability is determined as a second metric of the last one or more I/O requests that were sent before the threshold was exceeded. The second metric can be a number of the last one or more I/O requests or a throughput or capacity associated with the last one or more I/O requests.

The processor determines a first service having a load capability that satisfies a second threshold (508). In some embodiments, the second threshold is predetermined (e.g., static). For example, the second threshold can be a load capability below a predetermined load capability. In some embodiments, the second threshold is dynamic. For example, the second threshold can be the load capability that is the lowest (or highest) among the load capabilities of the multiple services of the endpoint. For example, if an object controller service has a load capability of 1 GB, a metadata service has a load capability of 2 GB, and a configuration manager has a load capability of 3 GB, then the load capability of object controller service satisfies the second threshold. The processor can sort (e.g., rank) the load capabilities to see which one is the lowest (or highest). The processor sends an indication of the first service to the external user (510).

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor having programmed instructions to:
   receive, from a user device, a request to identify a first service of an object store for which a first load capability correlates with a status provided by an endpoint of the object store, wherein the object store includes a plurality of object store services, wherein the plurality of object store services includes two or more of an object controller service, a metadata service, a lifecycle service, a configuration manager, and a user interface service;
   for each object store service of the plurality of object store services:
      send a first number of I/O requests;
      determine a metric associated with the first number of I/O requests;
      determine that the metric associated with the first number of I/O requests does not exceed a first threshold;
      send a second number of I/O requests, wherein the second number of I/O requests is greater than the first number of I/O requests; and
      determine a service load capability based on the metric and the second number of I/O requests;
   identify the first load capability as the service load capability that satisfies a second threshold; and
   send, to the user device, an indication of the first service having the first load capability.

2. The apparatus of claim 1, wherein the metric is one of latency, throughput, and capacity.

3. The apparatus of claim 1, the processor having further programmed instructions to identify the first service having a lowest service load capability.

4. The apparatus of claim 1, wherein the apparatus is located in the object store.

5. The apparatus of claim 1, wherein the apparatus is located in an external cluster coupled to the object store.

6. The apparatus of claim 1, the user device probes the status of the endpoint using an application programming interface (API).

7. A computer-implemented method comprising:
   receiving, from a user device, a request to identify a first service of an object store for which a first load capability correlates with a status provided by an endpoint of the object store, wherein the object store includes a plurality of object store services, wherein the plurality of object store services includes two or more of an object controller service, a metadata service, a lifecycle service, a configuration manager, and a user interface service;
   for each object store service of the plurality of object store services:
      sending a first number of I/O requests;
      determining a metric associated with the first number of I/O requests;
      determining that the metric associated with the first number of I/O requests does not exceed a first threshold;
      sending a second number of I/O requests, wherein the second number of I/O requests is greater than first the number of I/O requests; and
      determining a service load capability based on the metric and the second number of I/O requests;
   identifying the first load capability as the service load capability that satisfies a second threshold; and
   sending, to the user device, an indication of the first service having the first load capability.

8. The method of claim 7, wherein the metric is one of latency, throughput, and capacity.

9. The method of claim 7, further comprising identifying the first service having a lowest service load capability.

10. The method of claim 7, wherein the processor is located in the object store.

11. The method of claim 7, wherein the processor is located in an external cluster coupled to the object store.

12. The method of claim 7, the user device probes the status of the endpoint using an application programming interface (API).

13. A non-transitory computer readable storage medium having instructions stored thereon that, upon execution by a processor, cause the processor to:

receive, from a user device, a request to identify a first service of an object store for which a first load capability correlates with a status provided by an endpoint of the object store, wherein the object store includes a plurality of object store services, wherein the plurality of object store services includes two or more of an object controller service, a metadata service, a lifecycle service, a configuration manager, and a user interface service;

for each object store service of the plurality of object store services:
send a first number of I/O requests;
determine a metric associated with the first number of I/O requests;
determine that the metric associated with the first number of I/O requests does not exceed a first threshold;
send a second number of I/O requests, wherein the second number of I/O requests is greater than the first number of I/O requests; and
determine a service load capability based on the metric and the second number of I/O requests;

identify the first load capability as the service load capability that satisfies a second threshold; and
send, to the user device, an indication of the first service having the first load capability.

14. The storage medium of claim 13, wherein the metric is one of latency, throughput, and capacity.

15. The storage medium of claim 13, comprising the instructions stored thereon that, when executed by the processor, further cause the processor to identify the first service having a lowest service load capability.

16. The storage medium of claim 13, wherein the medium is located in the object store.

17. The storage medium of claim 13, wherein the medium is located in an external cluster coupled to the object store.

18. The storage medium of claim 13, the user device probes the status of the endpoint using an application programming interface (API).

19. A system comprising:
a resource pool comprising direct-attached storage and network-attached storage;
a plurality of hypervisors exposing the resource pool as a plurality of virtual disks; and
an object store exposing the plurality of disks as a plurality of buckets for storing a plurality of objects, wherein the object store comprises a processor having programmed instructions to:

receive, from a user device, a request to identify a first service of the object store for which a first load capability correlates with a status provided by an endpoint of the object store, wherein the object store includes a plurality of object store services, wherein the plurality of object store services includes two or more of an object controller service, a metadata service, a lifecycle service, a configuration manager, and a user interface service;

for each object store service of the plurality of object store services:
send a first number of I/O requests;
determine a metric associated with the first number of I/O requests;
determine that the metric associated with the first number of I/O requests does not exceed a first threshold;
send a second number of I/O requests, wherein the second number of I/O requests is greater than the first number of I/O requests; and
determine a service load capability based on the metric and the second number of I/O requests;

identify the first load capability as the service load capability that satisfies a second threshold; and
send, to the user device, an indication of the first service having the first load capability.

20. The system of claim 19, wherein the object store comprises a processor having programmed instructions to identify the first service having a lowest service load capability.

21. The system of claim 19, wherein the processor is located in the object store.

* * * * *